US009556037B2

(12) United States Patent
Tamura (10) Patent No.: US 9,556,037 B2
(45) Date of Patent: Jan. 31, 2017

(54) PROCESS FOR PRODUCING FLUORINE-CONTAINING COMBINED SALT

(75) Inventor: Tetsuya Tamura, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 509 days.

(21) Appl. No.: 14/113,156

(22) PCT Filed: Apr. 11, 2012

(86) PCT No.: PCT/JP2012/059848
§ 371 (c)(1),
(2), (4) Date: Oct. 21, 2013

(87) PCT Pub. No.: WO2012/144383
PCT Pub. Date: Oct. 26, 2012

(65) Prior Publication Data
US 2014/0050653 A1   Feb. 20, 2014

(30) Foreign Application Priority Data

Apr. 22, 2011  (JP) ................................. 2011-095855
Mar. 30, 2012  (JP) ................................. 2012-081673

(51) Int. Cl.
| | | |
|---|---|---|
| C01D 15/04 | (2006.01) | |
| C01F 11/22 | (2006.01) | |
| C01D 3/02 | (2006.01) | |
| C01B 9/08 | (2006.01) | |
| C01F 11/00 | (2006.01) | |
| C01G 23/00 | (2006.01) | |
| C01G 49/00 | (2006.01) | |
| C01G 1/06 | (2006.01) | |

(52) U.S. Cl.
CPC ................ *C01D 15/04* (2013.01); *C01B 9/08* (2013.01); *C01D 3/02* (2013.01); *C01F 11/00* (2013.01); *C01F 11/22* (2013.01); *C01G 1/06* (2013.01); *C01G 23/002* (2013.01); *C01G 49/009* (2013.01); *C01P 2004/03* (2013.01); *C01P 2004/52* (2013.01)

(58) Field of Classification Search
CPC ...................................... C01F 11/22
USPC ................................ 423/463, 464
See application file for complete search history.

(56) References Cited

U.S. PATENT DOCUMENTS

| | | | | |
|---|---|---|---|---|
| 2,925,325 | A * | 2/1960 | Kamlet ..................... | C01F 7/54 |
| | | | | 423/465 |
| 5,260,963 | A | 11/1993 | Baird et al. | |
| 2005/0252415 | A1* | 11/2005 | Budd ................... | A61K 6/0017 |
| | | | | 106/35 |
| 2006/0033025 | A1 | 2/2006 | Ichinose et al. | |
| 2008/0241040 | A1* | 10/2008 | Clothier ................ | B82Y 30/00 |
| | | | | 423/263 |
| 2011/0135555 | A1 | 6/2011 | Waki et al. | |

FOREIGN PATENT DOCUMENTS

| | | |
|---|---|---|
| CN | 1388057 A | 1/2003 |
| CN | 101343041 A | 1/2009 |
| JP | 2001-176510 A | 6/2001 |
| JP | 2002-234795 A | 8/2002 |
| JP | 2010-108956 A | 5/2010 |
| WO | WO 2004/086089 A1 | 10/2004 |
| WO | WO 2005/070831 A1 | 8/2005 |
| WO | WO 2010/016326 A1 | 2/2010 |

OTHER PUBLICATIONS

"An Introduction to Fluorine Chemistry 2010,—the Forefront of Fundamentals and Application—", compiled by Fluorine Chemistry No. 155, Committee of Japan Society for the Promotion of Science (2010).
Ravez, John, "The Inorganic Fluoride and Oxyfluoride Ferroelectrics", Journal de Physique III, Jun. 1997, pp. 1129-1144, France, Les Editions de Physique.
Quilty, J.W. et al., "Photostimulated luminescence and thermoluminescence in europium-doped barium magnesium fluoride", Current Applied Physics, 2008, pp. 420-424, vol. 8, Elsevier B.V.
Srivastava, A.M., et al., "On the $Eu^{2+}$—$Mn^{2+}$ Energy Transfer in $BaMgF_4$", Materials Chemistry and Physics, 1998, pp. 199-204, vol. 19, Elsevier Sequoia, The Netherlands.
Peresypkina, E.V., and V.A. Blatov, "Structure-forming Components in Crystals of Ternary and Quaternary 3d-metal Complex Fluorides", Acta Cryst., 2003, B59, pp. 361-377, Great Britain.

(Continued)

Primary Examiner — Ngoc-Yen Nguyen
(74) Attorney, Agent, or Firm — Crowell & Moring LLP (57) ABSTRACT

Disclosed is a process for producing a fluorine-containing complex salt, characterized by that, on a reaction mother liquor containing a plurality of cation species and a fluoroanion in a state that they have been dissolved in a solvent, a trigger for accelerating decomposition of the fluoroanion is allowed to act, thereby precipitating a complex salt containing a plurality of cation species and fluorine, as a solid, from the reaction mother liquor. According to this process, it is possible to produce a monodispersed fluorine-containing complex salt with uniform particle size and shape.

4 Claims, 1 Drawing Sheet

(56) References Cited

OTHER PUBLICATIONS

Yin, Yaobo and Douglas A. Keszler, "Crystal Chemistry of Colquiriite-Type Fluorides", Chem. Mater., 1992, pp. 645-648, vol. 4, American Chemical Society.
International Search Report with English translation thereof dated Jun. 12, 2012 {Five (5) pages}.
Japanese-language Written Opinion (PCT/ISA/237) dated Jun. 12, 2012 {Four (4) pages}.
Chinese Office Action dated Oct. 29, 2014 (10 pages).
Fujihara et al., "Sol-gel synthesis of inorganic complex fluorides using trifluoroacetic acid," Journal of Fluorine Chemistry, 2000, pp. 65-70, vol. 105, Elsevier Science S.A.
Belsare et al., "One step synthesis of complex fluoride powders for solid-state lasers," Journal of Alloys and Compounds, 2008, pp. 296-300, vol. 464, Elsevier B.V.

\* cited by examiner

PROCESS FOR PRODUCING FLUORINE-CONTAINING COMBINED SALT

TECHNICAL FIELD

The present invention relates to a process for producing fluorine-containing complex salts, which are applicable to optical materials, light-emitting materials, wavelength conversion materials, ferroelectric materials, magnetic materials, cathode and anode of batteries, solid electrolyte materials, ion conductor materials, fluxes, or sintering aids, etc.

BACKGROUND OF THE INVENTION

Fluorine-containing salts are known as compounds having unique characteristics, such as light transmitting property. In particular, complex salts (salts containing a plurality of cationic species) are useful as light-emitting materials, ferroelectric materials, etc. Non-patent Publication 1 describes complex fluorides, such as ion conductors (e.g., $PbSnF_4$), magnetic materials (e.g., $Ba_7CuFe_6F_{34}$), light-emitting materials (e.g., 4f-metal containing $KMgF_3$, $BaLiF_3$, and $LiYF_4$), ferroelectric materials (e.g., $SrAlF_5$ and $BaMgF_4$), etc. Non-patent Publication 2 also describes complex oxyfluoride ferroelectrics, such as $K_3MoO_3F_3$ and $Bi_2TiO_4F_2$, together with complex fluorides, such as $BaMF_4$ (M=Mg, Mn, Fe, Co, Ni or Zn), $SrMF_5$ (M=Al, Cr or Ga), and $BaMF_5$ (M=Ti, V, Fe, or In). Compounds having a structure of $LiA^{II}M^{III}F_6$ (A=metal species to become a bivalent cation(s), such as Mg, Ca, Sr, Ba, Ni, Cu, Zn, Cd, Hg, etc., and M=metal species to become a trivalent cation (s), such as Al, Ti, V, Cr, Mn, Fe, Co, Ni, etc.) are also known. The application to optical materials as shown in Patent Publication 1 and the application to cathode materials of lithium ion batteries as shown in Patent Publication 2 are examined. Furthermore, ferroelectric complex fluoride crystals, such as $BaMgF_4$, $BaZnF_4$, $SrAlF_5$, $Na_2MgAlF_7$, and $Na_2ZnAlF_7$, are mentioned, for example, in Patent Publication 3 as materials of wavelength conversion devices using nonlinear optical crystals, since they are highly transparent even in an ultraviolet region of 200 nm or shorter.

In case that a plurality of cations constituting a complex salt have similar ionic radii, a solid solution can be formed by occupying the same site in the crystals. In case that the difference of ionic radii becomes large, however, the formation of a solid solution in a wide range becomes difficult, resulting in occupying different sites in the crystals. For example, as shown in Non-patent Publication 2, in the case of $BaMF_4$ (M=Mg, Mn, Fe, Co, Ni or Zn), Ba occupies an 8-coordinated site, and M occupies a 6-coordinated site. Fluorine surrounding M takes a distorted octahedron structure, which connects with adjacent octahedron in the form of holding vertexes in common. By the rotation of this octahedron, the position occupied by Ba shifts to generate polarization inversion. Therefore, $BaMF_4$ shows ferroelectricity. Furthermore, as mentioned in Non-patent Publication 3, it is known that, since the lattice defects of F sites of $BaMgF_4$ well trap electrons, a superior light-emitting property is shown by doping with Eu or the like. Upon this, Eu selectively occupies Ba sites having a similar ionic radius. Furthermore, Non-patent Publication 4 shows an example of observation of the energy transfer from $Eu^{2+}$ to $Mn^{2+}$ by simultaneously doping $BaMgF_4$ with Eu and Mn. In this case, they selectively occupy sites having similar ionic radii, as Eu occupies Ba sites and as Mn occupies Mg sites.

Furthermore, Non-patent Publication 5 shows various crystal structures of $M1_nM2_mM3F_6$ type complex fluorides. Of these, for example, $LiCaAlF_6$ (LiCAF) and $LiSrAlF_6$ (LiSAF) are known to become laser materials by doping with Ce, Cr, etc. As shown in Non-patent Publication 6, it is known that both of LiCAF and LiSAF take a Colquiriite-type crystal structure, in which the layer of 6-coordinated Al and Li and the layer of 6-coordinated Ca (or Sr) are alternately laminated.

Thus, complex salts, particularly fluorine-containing complex salts that contain at least two cation-species groups not capable of forming a solid solution, respective groups occupying crystallographically distinct sites, are rich in functionality and contain many useful substances. Their syntheses are, however, not easy.

As processes for synthesizing fluorine-containing complex salts, there are known processes in which the syntheses are conducted in a gas atmosphere of fluorine or hydrogen fluoride or in a liquid of anhydrous hydrogen fluoride by using a solid mixture of single-cation fluorides, single-cation chlorides, single-cation nitrates, etc. as cation sources. In these processes, fluorine, hydrofluoric acid or hydrogen fluoride, which is highly reactive chemical species, is used as a reactant. Therefore, it has been difficult to control the atmosphere, remove an excess of the reactant from the product, or prevent corrosion of the production equipment. Furthermore, in the case of synthesizing a fluorine-containing complex salt by conducting a solid-phase mixing of single-cation fluorides and then calcination, there has been a defect that the unreacted, single-cation fluorides remain, since it is difficult to complete the solid-phase reaction.

In contrast with these conventional processes, there are proposed a sol-gel process using trifluoroacetic acid, and a one-step process by undergoing an aqueous solution phase. In the sol-gel process shown in Non-patent Publication 7, the constituent cations of fluorine-containing salts and trifluoroacetic acid are once dissolved in a solvent, followed by mixing. Then, a gel is obtained by distilling the solvent off by a step of concentration and drying and under certain circumstances by a preliminary calcination step of 200° C. This gel is pulverized and then calcined to produce a fluorine-containing salt in the end. Fluorine is generated by a thermal decomposition of trifluoroacetate anion. Since this decomposition temperature is around 300° C., it is understood that the reaction of synthesizing the fluorine-containing salt proceeds by the calcination step. Furthermore, in the one-step process shown in Non-patent Publication 8, the constituent cations of the target salt are dissolved in an aqueous solution, followed by adding hydrogen fluoride, thereby conducting the reaction and synthesizing a fluorine-containing salt. In each example, there is reported the synthesis of fluorine-containing complex salts, such as $BaMgF_4$, $SrAlF_5$, and $LiCaAlF_6$.

PRIOR ART PUBLICATIONS

Patent Publications

Patent Publication 1: Specification of U.S. Pat. No. 5,260,963
Patent Publication 2: Japanese Patent Application Publication 2001-176510
Patent Publication 3: Japanese Patent Application Publication 2010-108956

Non-Patent Publications

Non-patent Publication 1: "An Introduction to Fluorine Chemistry 2010, —the Forefront of Fundamentals and Application—" compiled by Fluorine Chemistry No. 155 Committee of Japan Society for the Promotion of Science (2010).

Non-patent Publication 2: J. Ravez, J. Phys. III France 7 (1997) 1129-1144

Non-patent Publication 3: J. W. Quilty et. al., Current Applied Physics 8 (2008) 420-424

Non-patent Publication 4: A. M. Srivastava et. al., Materials Chemistry and Physics, 19 (1988) 199-204

Non-patent Publication 5: E. V. Peresypkina and V. A. Blatov, Acta Cryst. (2003) B59, 361-377

Non-patent Publication 6: Y. Yin and D. A. Keszler, Chem. Mater. (1992) 4, 645-648

Non-patent Publication 7: Shinobu Fujihara et. al., Journal of Fluorine Chemistry 105 (2000) 65-70

Non-patent Publication 8: P. D. Belsare et. al., Journal of Alloys and Compounds 464 (2008) 296-300

SUMMARY OF THE INVENTION

It was, however, not possible in conventional processes or the above-mentioned new processes to obtain a monodispersed, fluorine-containing complex salt that was uniform in particle size and shape by controlling the particle size and shape of the product. In the sol-gel process, the fluorine-containing complex salt is produced by a solid phase reaction after distilling the solvent off. Furthermore, in the one-step process, the reaction proceeds at the moment of adding hydrofluoric acid. Therefore, in each of these, a precursor state of the reaction for producing a fluorine-containing complex salt becomes nonuniform. This is because why it was not possible.

It is an object of the present invention to provide a novel process for producing a monodispersed, fluorine-containing complex salt that is uniform in particle size and shape, particularly a fluorine-containing complex salt that contains at least two cation-species groups not capable of forming a solid solution, respective groups occupying crystallographically distinct sites.

As a result of studying the process for producing a fluorine-containing complex salt, the present inventor has found that, in a reaction mother liquor containing a plurality of cation species and fluoroanions in a state that they have been dissolved in a solvent, it is possible to uniformly produce a fluorine-containing complex salt in the reaction mother liquor by gradually decomposing the fluoroanions by an action of a trigger, and, as a result, it is possible to obtain a monodispersed fluorine-containing complex salt that is uniform in particle size and shape, thereby reaching the present invention.

In the present invention, "monodispersed" means that the particle size and shape of the fluorine-containing complex salt produced are uniform.

According to the present invention, there is provided a process (first process) for producing a fluorine-containing complex salt, characterized by that, on a reaction mother liquor containing a plurality of cation species and a fluoroanion in a state that they have been dissolved in a solvent, a trigger for accelerating decomposition of the fluoroanion is allowed to act, thereby precipitating a complex salt containing a plurality of cation species and fluorine, as a solid, from the reaction mother liquor.

The first process may be a process (second process) for producing a fluorine-containing complex salt, characterized by that the trigger for accelerating decomposition of the fluoroanion is an application of an energy to the reaction mother liquor, a change of acidity of the reaction mother liquor by an action of a substance for changing acidity, or both of them.

The first or second process may be a process (third process) for producing a fluorine-containing complex salt, characterized by that at least one species of the plurality of cation species is a monovalent cation of an element of group 1, an at least divalent cation of an element of group 2, or an at least trivalent cation of an element of group 3 to group 13.

Any one of the first to third processes may be a process (fourth process) for producing a fluorine-containing complex salt, characterized by that the fluoroanion has an A-F bond (herein, A is at least one element selected from the group consisting of Al, Ti, B, Si, P, S, As, Se, Sb and Te). It is more preferable that the above A is at least one element selected from the group consisting of B, Si, P, S, As, Se, Sb, and Te. It is particularly preferable that the above A is at least one element selected from the group consisting of B, Si, P, and S.

Any one of the first to fourth processes may be a process (fifth process) for producing a fluorine-containing complex salt, characterized by that the fluoroanion is at least one selected from the group consisting of $TiF_6^{2-}$, $AlF_6^{3-}$, $BF_4^-$, $SiF_6^{2-}$, $PF_6^-$, $PO_3F_2^-$, $PO_2F_2^-$, and $SO_3F^-$. It is more preferable that the fluoroanion is at least one selected from the group consisting of $BF_4^-$, $SiF_6^{2-}$, $PF_6^-$, $PO_3F_2^-$, $PO_2F_2^-$, and $SO_3F^-$. It is the most preferably $BF_4^-$ or $PF_6^-$.

Any one of the first to fifth processes may be a process (sixth process) for producing a fluorine-containing complex salt, characterized by that the substance for changing acidity of the reaction mother liquor is at least one selected from the group consisting of an acid, a base, and a chemical species that generates an acid or base by applying energy.

Furthermore, according to the present invention, there is provided a fluorine-containing complex salt (a first complex salt) produced by any one of the first to sixth processes.

The first complex salt may be a fluorine-containing complex salt (a second complex salt), characterized by that it contains at least two cation-species groups not capable of forming a solid solution and that the respective groups occupy crystallographically distinct sites. This is because complex salts having such structure have high functionality. For example, when the concentration of a light-emitting element is too high in light-emitting materials, concentration quenching is generated, thereby lowering the light-emission efficiency. Therefore, it is known to work advantageously to have sites not capable of forming a solid solution in order to regularly increase the distance between the light-emitting elements.

Furthermore, in general, it is difficult to synthesize the second complex salt by reason that a mixture of single salts of the respective cation species tends to be formed as an impurity. Therefore, the production process of the present invention is particularly effective for producing the fluorine-containing complex salt.

As the fluorine-containing complex salt, it is possible to cite, for example, simple substances of $BaMF_4$ (M=Mg, Mn, Fe, Co, Ni or Zn), $SrMF_5$ (M=Al, Cr or Ga), $BaMF_5$ (M=Ti, V, Fe, or In), and $LiA^{II}M^{III}F_6$ (A=metal species that becomes a bivalent cation(s), such as Mg, Ca, Sr, Ba, Ni, Cu, Zn, Cd, or Hg; M=metal species that becomes a trivalent cation(s), such as Al, Ti, V, Cr, Mn, Fe, Co, or Ni) and solid solutions containing these as hosts, $A_2BMO_3F_3$ (A, B=K, Rb or Cs, ionic radius of $A^+$>ionic radius of $B^+$, and M=Mo or W), LiM—LiF-MO2F series solid solution (M=Nb or Ta), $LiMO_3$—$LiMgF_3$ series solid solution (M=Nb or Ta), etc.

According to the production process of the present invention, it is also possible to produce fluorine-containing complex salts other than the second complex salt, such as $Ln_{1-X}M_XF_{3-X}$ (Ln is Y, La, Ce, etc.; and M is Ba, Sr, Ca, etc.), $Pb_{1-X}Sn_XF_2$ (X is 0.25 or less), $La_{1-X}Ln_XOF$ (Ln=Eu or Ce), and the like.

Furthermore, according to the present invention, there is provided a reaction mother liquor which contains a plurality of cation species and a fluoroanion in a state that they have been dissolved in a solvent, and which is used in any one of the first to sixth processes.

Furthermore, according to the present invention, there is provided a reagent kit which comprises a reaction mother liquor containing a plurality of cation species and a fluoroanion in a state that they have been dissolved in a solvent, and a substance for changing acidity of the reaction mother liquor, and which is used in any one of the first to sixth processes. The reagent kit is one prepared by storing the mother liquor and the substance for changing acidity of the reaction mother liquor in separate containers. A mixed liquid of them is used for precipitating the fluorine-containing complex salt.

Furthermore, according to the present invention, there is provided a reagent kit which comprises a reaction mother liquor containing a plurality of cation species and a substance for changing acidity of the reaction mother liquor in a state that they have been dissolved in a solvent, and a fluoroanion, and which is used in any one of the first to sixth processes. The reagent kit is one prepared by storing the mother liquor and the fluoroanion in separate containers. A mixed liquid of them is used for precipitating the fluorine-containing complex salt.

Advantageous Effect of the Invention

According to the production process of the present invention, it is possible to produce a monodispersed fluorine-containing complex salt that is uniform in particle size and shape. Furthermore, it is also possible to control the crystal particle size and the plane orientation of the crystal growth by optimizing the production conditions.

DETAILED DESCRIPTION

The present invention is a process for producing a fluorine-containing complex salt, characterized by that, on a reaction mother liquor containing a plurality of cation species and fluoroanions in a state that they have been dissolved in a solvent, a trigger for accelerating decomposition of the fluoroanions is allowed to act, thereby precipitating a complex salt containing a plurality of cation species and fluorine, as a solid, from the reaction mother liquor.

It is preferable that major constituent cations of the fluorine-containing complex salt as the target for synthesis are "hard acids" defined in Pearson's HSAB concept. That is, it is preferable that they are cations that have a localized positive charge and a low polarizability. In the case of an element capable of taking a plurality of valences, a cation having a larger positive charge is preferable. In the case of cations of the same group and the same valence, one having a smaller ionic radius is preferable. Specifically, it is preferable to contain at least one selected from onium ions, monovalent cations of elements of group 1, at least divalent cations of elements of group 2, and at least trivalent cations of elements of groups 3 to 13.

As the onium ions, for example, $NH_4^+$ can be mentioned. As the monovalent cations of elements of group 1, it is possible to mention, for example, $H^+$, $Li^+$, $Na^+$, $K^+$ and $Rb^+$. As the at least divalent cations of elements of group 2, it is possible to mention, for example, $Be^{2+}$, $Mg^{2+}$, $Ca^{2+}$, $Sr^{2+}$, $Ba^{2+}$, and $Ra^{2+}$.

As the at least trivalent cations of elements of groups 3 to 13, it is possible to mention $Sc^{3+}$, $Y^{3+}$, $La^{3+}$, $Ce^{3+}$, $Ce^{4+}$, $Pr^{3+}$, $Pr^{4+}$, $Nd^{3+}$, $Pm^{3+}$, $Sm^{3+}$, $Eu^{3+}$, $Gd^{3+}$, $Tb^{3+}$, $Tb^{4+}$, $Dy^{3+}$, $Ho^{3+}$, $Er^{3+}$, $Tm^{3+}$, $Yb^{3+}$, $Lu^{3+}$, $Ac^{3+}$, $Th^{4+}$, $Pa^{4+}$, $Pa^{5+}$, $U^{3+}$, $U^{4+}$, $U^{5+}$, $U^{6+}$, $Np^{3+}$, $Np^{4+}$, $Np^{5+}$, $Np^{6+}$, $Np^{7+}$, $Pu^{3+}$, $Pu^{4+}$, $Pu^{5+}$, $Pu^{6+}$, $Pu^{7+}$, $Ti^{3+}$, $Ti^{4+}$, $Zr^{3+}$, $Zr^{4+}$, $Hf^{3+}$, $Hf^{4+}$, $V^{3+}$, $V^{4+}$, $V^{5+}$, $Nb^{3+}$, $Nb^{4+}$, $Nb^{5+}$, $Ta^{3+}$, $Ta^{4+}$, $Ta^{5+}$, $Cr^{3+}$, $Cr^{4+}$, $Cr^{5+}$, $Cr^{6+}$, $Mo^{3+}$, $Mo^{4+}$, $Mo^{5+}$, $Mo^{6+}$, $W^{3+}$, $W^{4+}$, $W^{5+}$, $W^{6+}$, $Mn^{3+}$, $Mn^{4+}$, $Mn^{5+}$, $Mn^{6+}$, $Mn^{7+}$, $Tc^{4+}$, $Tc^{5+}$, $Tc^{6+}$, $Tc^{7+}$, $Re^{4+}$, $Re^{6+}$, $Fe^{3+}$, $Fe^{4+}$, $Fe^{6+}$, $Ru^{3+}$, $Ru^{4+}$, $Ru^{6+}$, $Ru^{8+}$, $Os^{3+}$, $Os^{4+}$, $Os^{5+}$, $Os^{6+}$, $Os^{7+}$, $Os^{8+}$, $Co^{3+}$, $Co^{4+}$, $Rh^{3+}$, $Rh^{4+}$, $Rh^{5+}$, $Rh^{6+}$, $Ir^{3+}$, $Ir^{4+}$, $Ir^{6+}$, $Ni^{3+}$, $Ni^{4+}$, $Ni^{5+}$, $Pt^{4+}$, $Pt^{5+}$, $Pt^{6+}$, $Cu^{3+}$, $Al^{3+}$, $Ga^{3+}$, $In^{3+}$, and $Tl^{3+}$.

Furthermore, it is more preferable to contain at least one of at least divalent cations of elements of group 2 and at least trivalent cations of elements of group 3 and Al, Ti, V, Cr, Mn, Fe, Co, and Ni.

The solvent contained in the reaction mother liquor is not particularly limited, as long as it is capable of dissolving the raw material cations. Aqueous and nonaqueous ones are both usable. In particular, ones having polarity are preferable from the side of solubility of the raw material cations. As examples of the polar solvent, it is possible to mention water, alcohol, glycols such as ethylene glycol and PEG, and glycerol. It is also possible to use an acid liquid such as acetic acid. There is selected the optimum one as the solvent, from the viewpoints of the effects on the crystal particle size and the plane orientation of the crystal growth of the fluorine-containing complex salt and the degree of contamination of the fluorine-containing complex salt by the solvent and/or by-products, in addition to the degree of solubility of cations as mentioned above. From the viewpoint of cost, aqueous ones are the most preferable.

As counter anions of the raw material cations, it is possible to select acetate, chloride, hydroxide, nitrate, sulfate, etc. It is preferable to select a counter anion having a high solubility corresponding to the cation species to be used. For example, in the case of Mg, solubility of the hydroxide is low. In the case of Ba, solubility of the sulfate is low. Therefore, in the case of producing $BaMgF_4$, acetates, chlorides and nitrates are preferable as the raw materials.

As the fluoroanions, one having A-F bond (A is a typical element) is preferable. In particular, it is more preferable that A is at least one element selected from the group consisting of Al, Ti, B, Si, P, S, As, Se, Sb, and Te. It is more preferable that the above A is at least one element selected from the group consisting of B, Si, P, S, As, Se, Sb, and Te. It is particularly preferable that the above A is at least one element selected from the group consisting of B, Si, P, and S.

As typical examples of specific anion species, it is possible to mention $TiF_6^{2-}$, $AlF_6^{3-}$, $BF_4^-$, $SiF_6^{2-}$, $PF_6^-$, $PO_3F_2^-$, $PO_2F_2^-$, $SO_3F^-$, etc. It is more preferable that the fluoroanions are at least one selected from the group consisting of $BF_4^-$, $SiF_6^{2-}$, $PF_6^-$, $PO_3F_2^-$, $PO_2F_2^-$, and $SO_3F^-$. It is the most preferably $BF_4^-$ or $PF_6^-$. In the case of producing the complex fluoride, it is preferable that the number of fluorine atoms becomes greater than the equivalence. This is because the yield may lower, or impurity phases or amorphous phases may be produced as by-products, if the number of fluorine atoms becomes less than the equivalence.

As the trigger for accelerating decomposition of the fluoroanions, it is possible to use the application of an energy, such as heat, pressure, electromagnetic waves such as light and microwaves, etc., and the change of acidity of the reaction mother liquor by an action of a substance for changing acidity, such as acid and base. It is also possible to use a combination of these. Furthermore, in the reaction mother liquor, it is also possible to contain a chemical species that is decomposed by the application of energy, such as heat or electromagnetic waves, to generate acid or base, and apply the energy. As examples of the chemical species that are decomposed by applying energy to generate acid, it is possible to mention esters such as ethyl acetate, and photoacid generators such as benzophenones, acetophenones, diazonium salts, iodonium salts and sulfonium salts. As examples of a chemical species that is decomposed by applying energy to generate a base, it is possible to mention urea, hexamethylene tetramine, etc.

In the case of using the above-mentioned chemical species, it is necessary to control the reaction conditions in order to prevent precipitation of by-products. For example, in the case of producing $BaMgF_4$ by decomposing $BF_4^-$, a precipitate of magnesium hydroxide is precipitated as solid by making the reaction mother liquor strongly alkaline. Thus, it is necessary to use an acidic reaction mother liquor, and it is preferable to gradually weaken acidity (i.e., increase pH) of the liquid in order to accelerate decomposition of $BF_4^-$. In this synthesis, however, the addition of urea may cause precipitation of a carbonate such as barium carbonate. In this synthesis, hexamethylene tetramine is preferable and can maintain the liquid after the decomposition at around neutrality even if it is added to large excess.

In the case of applying energy to the reaction mother liquor as the trigger for accelerating decomposition of the fluoroanions, specifically, for example, the following methods can be mentioned.

(1) In the case of accelerating decomposition of the fluoroanions only by applying energy to the reaction mother liquor (2) In the case of accelerating decomposition of the fluoroanions by containing acid or base as a substance for changing acidity in the reaction mother liquor and applying energy (3) In the case of accelerating decomposition of the fluoroanions by containing a chemical species, which generates acid or base by the application of energy, as a substance for changing acidity in the reaction mother liquor and applying energy.

Furthermore, in the case of utilizing the change of acidity of the reaction mother liquor by the action of a substance for changing acidity as a trigger for accelerating decomposition of the fluoroanions, specifically, for example, the following methods can be mentioned.

(4) In the case of accelerating decomposition of the fluoroanions by containing acid or base as a substance for changing acidity in the reaction mother liquor In the following, details of each of the above-mentioned specific examples are mentioned.

(1) In the case of accelerating decomposition of the fluoroanions only by applying energy to the reaction mother liquor It is optional to apply energy to the reaction mother liquor containing a plurality of cation species and fluoroanions in a state that they have been dissolved in a solvent. Furthermore, it is optional that, while energy is applied to the reaction mother liquor containing a plurality of cation species in a state that they have been dissolved, the fluoroanions are mixed with the reaction mother liquor.

By conducting the above treatment, a fluorine-containing complex salt is precipitated as a solid from the reaction mother liquor. When preparing the reaction mother liquor, it is preferable from the viewpoint of productivity to use both of heating and mechanical stirring, while trying to prevent the amount of the solvent from decreasing by a large amount by evaporation. In the case of applying energy by applying heat, it is preferable to conduct mechanical stirring too in order to avoid depletion of the solvent by evaporation or boiling and to maintain uniformity of the liquid. In the case of applying heat, it is preferable to maintain the temperature of the reaction mother liquor at a temperature of from 40° C. to the boiling point of the mother liquor. Furthermore, it is preferable to avoid depletion of the solvent by using a vapor reflux condensing mechanism or a pressure sealed container. In the case of applying energy by applying pressure, it is preferably a uniform pressurization on the entirety of the liquid phase, such as solvothermal method. In the case of applying energy by applying electromagnetic waves such as light and microwaves, it is preferable to uniformly apply electromagnetic waves to the inside of a container or circularly supply the reaction mother liquor to a section where electromagnetic waves are applied.

Furthermore, the above assumes precipitation of a fluorine-containing complex salt by the reaction in the container, but it is also possible to precipitate a fluorine-containing complex salt in a condition that the reaction mother liquor has been uniformly applied onto a substrate. In this case, it is preferable that heat application is conducted to the substrate itself or uniformly conducted by a heater carrying the substrate, and it is preferable that pressure application is conducted to the container whole after putting the substrate into the container.

Furthermore, it is also possible to uniformly apply electromagnetic waves onto the substrate, but it is also possible to selectively conduct that on only a place where the precipitation is conducted for the purpose of a patterning onto the substrate. It is optional to apply energy by combining energies such as heat, pressure, and electromagnetic waves such as light and microwaves.

(2) In the case of accelerating decomposition of the fluoroanions by containing acid or base as a substance for changing acidity in the reaction mother liquor and applying energy As a method of containing acid or base in the reaction mother liquor, there is used a reagent kit comprising a reaction mother liquor containing a plurality of cation species and fluoroanions in a condition that they have been dissolved in a solvent, and the acid or base, and it is conducted by mixing them.

Alternatively, there is used a reagent kit comprising a reaction mother liquor containing a plurality of cation species and the acid or base in a condition that they have been dissolved in a solvent, and fluoroanions, and it is conducted by mixing them.

The application of energy may be conducted to either one or both of the above-mentioned reagent kit prior to the mixing. It may be conducted to the mixed liquid while mixing the reagent kit. It may be conducted to the reaction mother liquor after the mixing.

By conducting the above treatment, a fluorine-containing complex salt is precipitated as a solid from the reaction mother liquor. In the case of applying energy by applying heat, it is preferable to conduct mechanical stirring too in order to avoid depletion of the solvent by evaporation or boiling and to maintain uniformity of the liquid. In the case of applying heat, it is preferable to maintain the temperature of the reagent prior to the mixing, its mixed liquid, or the reaction mother liquor at a temperature of from 40° C. to the boiling point of the liquor. Furthermore, it is preferable to avoid depletion of the solvent by using a vapor reflux condensing mechanism or a pressure sealed container. In the case of applying energy by applying pressure, it is preferably a uniform pressurization on the entirety of the liquid phase, such as solvothermal method. In the case of applying energy by applying electromagnetic waves such as light and microwaves, it is preferable to uniformly apply electromagnetic waves to the inside of a container or circularly supply the reagent prior to the mixing, its mixed liquid or the reaction mother liquor to a section where electromagnetic waves are applied.

Furthermore, the above assumes precipitation of a fluorine-containing complex salt by the reaction in the container, but it is also possible to precipitate a fluorine-containing complex salt in a condition that the reaction mother liquor has been uniformly applied onto a substrate. In this case, it is preferable that heat application is conducted to the substrate itself or uniformly conducted by a heater carrying the substrate, and it is preferable that pressure application is conducted to the container whole after putting the substrate into the container. Furthermore, it is also possible to uniformly supply the acid, base or fluoroanions in a condition of vapor or mist to the entirety of the substrate.

Furthermore, it is also possible to uniformly apply electromagnetic waves onto the substrate, but it is also possible to selectively conduct that on only a place where the precipitation is conducted for the purpose of a patterning onto the substrate. It is optional to apply energy by combining energies such as heat, pressure, and electromagnetic waves such as light and microwaves.

In case that, even if acid or base is contained as a substance for changing acidity, the substance alone does not cause decomposition of the fluoroanions, it is preferable to previously contain the substance in the reaction mother liquor and then apply energy. For example, decomposition of $PF_6^-$ does not occur only by adding acetic acid. Therefore, after preparing a uniform mother liquor in which the acid has been contained, it is possible to apply energy to this. According to this method, it is possible to precipitate a more uniform, fluorine-containing complex salt as a solid. Therefore, it is preferable.

(3) In the case of accelerating decomposition of the fluoroanions by containing a chemical species, which generates acid or base by the application of energy, as a substance for changing acidity in the reaction mother liquor and applying energy As a method of obtaining a mother liquor in which the chemical species has been contained, there is used a reagent kit comprising a reaction mother liquor containing a plurality of cation species and fluoroanions in a condition that they have been dissolved in a solvent, and the chemical species, and it is conducted by mixing them.

Alternatively, there is used a reagent kit comprising a reaction mother liquor containing a plurality of cation species and the chemical species in a condition that they have been dissolved in a solvent, and fluoroanions, and it is conducted by mixing them.

The application of energy may be conducted to either one or both of the above-mentioned reagent kit prior to the mixing. It may be conducted to the mixed liquid while mixing the reagent kit. It may be conducted to the reaction mother liquor after the mixing.

By conducting the above treatment, a fluorine-containing complex salt is precipitated as a solid from the reaction mother liquor. In the case of applying energy by applying heat, it is preferable to conduct mechanical stirring too in order to avoid depletion of the solvent by evaporation or boiling and to maintain uniformity of the liquid. In the case of applying heat, it is preferable to maintain the temperature of the reagent prior to the mixing, its mixed liquid, or the reaction mother liquor at a temperature of from 40° C. to the boiling point of the liquor. Furthermore, it is preferable to avoid depletion of the solvent by using a vapor reflux condensing mechanism or a pressure sealed container. In the case of applying energy by applying pressure, it is preferably a uniform pressurization on the entirety of the liquid phase, such as solvothermal method. In the case of applying energy by applying electromagnetic waves such as light and microwaves, it is preferable to uniformly apply electromagnetic waves to the inside of a container or circularly supply the reagent prior to the mixing, its mixed liquid or the reaction mother liquor to a section where electromagnetic waves are applied.

Furthermore, the above assumes precipitation of a fluorine-containing complex salt by the reaction in the container, but it is also possible to precipitate a fluorine-containing complex salt in a condition that the reaction mother liquor has been uniformly applied onto a substrate. In this case, it is preferable that heat application is conducted to the substrate itself or uniformly conducted by a heater carrying the substrate, and it is preferable that pressure application is conducted to the container whole after putting the substrate into the container.

Furthermore, it is also possible to uniformly apply electromagnetic waves onto the substrate, but it is also possible to selectively conduct that on only a place where the precipitation is conducted for the purpose of a patterning onto the substrate. It is optional to apply energy by combining energies such as heat, pressure, and electromagnetic waves such as light and microwaves.

Even if the chemical species is contained as a substance for changing acidity, the chemical species alone does not cause decomposition of the fluoroanions. Therefore, it is preferable to previously contain the substance in the reaction mother liquor and then apply energy. For example, decomposition of $BF_4^-$ does not occur only by adding urea or hexamethylene tetramine. Therefore, after preparing a uniform mother liquor in which the urea or hexamethylene tetramine has been contained, it is possible to apply energy to this. According to this method, it is possible to precipitate a more uniform, fluorine-containing complex salt as a solid. Therefore, it is preferable. Urea or hexamethylene tetramine is gradually decomposed even at room temperature particularly in solvent. Therefore, it is preferable to use the mother liquor as soon as after its preparation.

(4) In the case of accelerating decomposition of the fluoroanions by containing acid or base as a substance for changing acidity in the reaction mother liquor It is optional to add acid or base to the reaction mother liquor containing a plurality of cation species and fluoroanions in a state that they have been dissolved in a solvent.

Furthermore, it is optional to simultaneously mix fluoroanions and acid or base with the reaction mother liquor containing a plurality of cation species in a state that they have been dissolved. Furthermore, it is optional that, to the reaction mother liquor containing a plurality of cation species in a state that they have been dissolved, acid or base and then fluoroanions are added.

By conducting the above treatment, a fluorine-containing complex salt is precipitated as a solid from the reaction mother liquor. When preparing the reaction mother liquor, it is preferable from the viewpoint of productivity to use both of heating and mechanical stirring, while trying to prevent the amount of the solvent from decreasing by a large amount by evaporation. It is preferable to add acid or base, while sufficiently conducting a mechanical stirring and mixing. For example, ammonia as a weak base is high in reactivity to rapidly change acidity of the reaction mother liquor. Therefore, it is preferable to add ammonia dropwise to conduct the reaction while stirring the reaction mother liquor. Alternatively, it is preferable to introduce ammonia vapor or mist into a sealed reaction container while stirring the reaction mother liquor.

Except for the case of conducting pressure application as energy application, in the above methods (1) to (4), it is possible to arbitrarily select the pressure when accelerating decomposition of the fluoroanions. In particular, an open system under atmospheric pressure or a sealed system (solvothermal method) is preferable. In the case of conducting it in an open system, the solvent may be discharged to the outside of the system by volatilization or boiling. Therefore, it is desirable to use an apparatus having a reflux mechanism. Furthermore, the atmosphere control is also admissible. In particular, for the purpose of controlling oxidation state of the fluorine-containing complex salt, it is also possible to conduct the production in an inert gas atmosphere. Furthermore, to the reaction mother liquor, it is optional to add an additive, such as ethylene glycol, polyethylene glycol, polyvinylpyrrolidone, hexylamine, high-order carboxylic acids, peroxides, or ascorbic acid, formic acid, sulfur-containing acids such as thiosulfuric acid, phosphorus-containing acids such as phosphonic acid, and salts of these. Depending on the type of the additive, it may be possible to achieve the crystal growth control or the oxidation state control.

In the present production process, a fluorine-containing complex salt is produced in the reaction mother liquor. As a post-treatment method for recovering the complex salt, it is optional to use separation such as filtration and centrifugation, purification, and washing. Furthermore, it is optional to subsequently conduct baking or the like. Without separating the solid, it may be used as a slurry or suspension.

EXAMPLES

In the following, the present invention is explained in more detail by examples. Embodiments of the present invention are not limited to this.

Example 1

At room temperature, respective components were dissolved and mixed, to prepare a reaction mother liquor of the following composition.

Magnesium acetate tetrahydrate: 0.10 mmol/g (2.1 mass %)
Barium acetate: 0.10 mmol/g (2.5 mass %)
Ammonium hexafluorophosphate: 0.23 mmol/g (3.8 mass %)
Acetic acid: 5.14 mmol/g (30.8 mass %)
Ethylene glycol: 40.0 mass %
Water: 20.8 mass %

Figure 1:
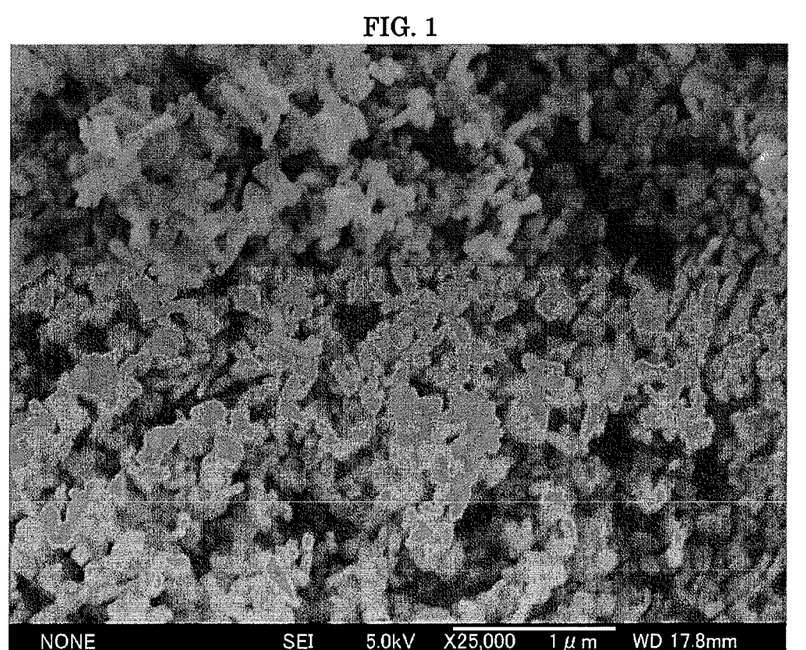
FIG. 1 is an electron microscope photograph showing one example of a fluorine-containing complex salt produced by the production process of the present invention.

This mother liquor was put into an open-to-the-atmosphere type reactor equipped with a reflux condenser. It was heated at 130° C. for three hours with stirring. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 1. The dry substance salt 1 and a baked substance of the dry substance salt 1 prepared by baking the dry substance salt 1 at 150° C., 400° C. or 600° C. for two hours each were confirmed by a powder X-ray diffraction method to be $BaMgF_4$. As a result of observing the dry substance salt 1 with a scanning electron microscope, as shown in FIG. 1, it was found to be composed of monodispersed primary particles with uniform particle size and shape.

Example 2

At room temperature, respective components were dissolved and mixed, to prepare a reaction mother liquor of the following composition.

Magnesium acetate tetrahydrate: 0.11 mmol/g (2.4 mass %)
Barium acetate: 0.11 mmol/g (2.8 mass %)
Acetic acid: 5.69 mmol/g (34.7 mass %)
Ethylene glycol: 43.8 mass %
Water: 16.3 mass %

This mother liquor was put into an open-to-the-atmosphere type reactor equipped with a reflux condenser. It was heated at 130° C. with stirring. An ammonium hexafluorophosphate aqueous solution (concentration: 2.4 mmol/g) equivalent to 10.5 mass % of the total of the mother liquor was added dropwise, followed by maintaining for three hours. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 2. The obtained dry substance salt 2 was confirmed by a powder X-ray diffraction method to be $BaMgF_4$. As a result of observing the dry substance salt 2 with a scanning electron microscope, it was found to be composed of monodispersed primary particles with uniform particle size and shape.

Example 3

At room temperature, respective components were dissolved and mixed, to prepare a reaction mother liquor of the following composition.

Magnesium acetate tetrahydrate: 0.14 mmol/g (3.0 mass %)
Barium acetate: 0.14 mmol/g (3.6 mass %)
Ammonium hexafluorophosphate: 0.32 mmol/g (5.2 mass %)
Ethylene glycol: 58.0 mass %
Water: 30.2 mass %

This mother liquor was put into an open-to-the-atmosphere type reactor equipped with a reflux condenser. It was heated at 130° C. with stirring. Acetic acid equivalent to 45 mass % of the total of the mother liquor was added dropwise, followed by maintaining for three hours. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 3. The obtained dry substance salt 3 was confirmed by a powder X-ray diffraction method to be $BaMgF_4$. As a result of observing the dry substance salt 3 with a scanning electron microscope, it was found to be composed of monodispersed primary particles with uniform particle size and shape.

Example 4

At room temperature, respective components were dissolved and mixed, to prepare a reaction mother liquor of the following composition.
Magnesium acetate tetrahydrate: 0.08 mmol/g (1.7 mass %)
Barium acetate: 0.08 mmol/g (2.0 mass %)
Ammonium hexafluorophosphate: 0.16 mmol/g (2.6 mass %)
Acetic acid: 3.41 mmol/g (20.8 mass %)
Glycerol: 72.9 mass %
This mother liquor was put into an open-to-the-atmosphere type reactor equipped with a reflux condenser. It was heated at 130° C. for three hours with stirring. With the passage of time, a white-color solid was gradually precipitated. It was allowed to cool by stopping the heating. After that, the precipitated white-color solid was centrifuged, followed by washing with methanol and then air-drying, thereby obtaining a dry substance salt 4. The obtained dry substance salt 4 was confirmed by a powder X-ray diffraction method to be $BaMgF_4$. As a result of observing the dry substance salt 4 with a scanning electron microscope, it was found to be composed of monodispersed primary particles with uniform particle size and shape.

Example 5

At room temperature, respective components were dissolved and mixed, to prepare a reaction mother liquor of the following composition.
Magnesium acetate tetrahydrate: 0.24 mmol/g (5.1 mass %)
Barium acetate: 0.24 mmol/g (6.1 mass %)
Ammonium hexafluorophosphate: 0.50 mmol/g (8.2 mass %)
Acetic acid: 4.06 mmol/g (24.7 mass %)
Water: 55.9 mass %
This mother liquor was put into a sealed reactor. With stirring, it was heated for three hours in an oil bath of 150° C. With this, the inside pressure of the container gradually increased and reached 0.25 MPa-G. It was allowed to cool by stopping the heating. After that, the precipitated white-color solid was centrifuged, followed by washing with methanol and then air-drying, thereby obtaining a dry substance salt 5. The obtained dry substance salt 5 was confirmed by a powder X-ray diffraction method to be $BaMgF_4$. As a result of observing the dry substance salt 5 with a scanning electron microscope, it was found to be composed of monodispersed primary particles with uniform particle size and shape.

Example 6

At room temperature, respective components were dissolved and mixed, to prepare a reaction mother liquor of the following composition.
Magnesium acetate tetrahydrate: 0.24 mmol/g (5.1 mass %)
Barium acetate: 0.24 mmol/g (6.1 mass %)
Tetrafluoroboric acid: 0.50 mmol/g (4.4 mass %)
Hexamethylene tetramine: 1.68 mmol/g (23.6 mass %)
Water: 60.8 mass %
This mother liquor was put into an open-to-the-atmosphere type reactor equipped with a reflux condenser. With stirring, it was heated for three hours at 130° C. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 6. A liquid prepared by combining the filtrate with the primary washing water was neutral (pH: about 6-8). The obtained dry substance salt 6 was confirmed by a powder X-ray diffraction method to be $BaMgF_4$. As a result of observing the dry substance salt 6 with a scanning electron microscope, it was found to be composed of monodispersed primary particles with uniform particle size and shape.

Example 7

At room temperature, respective components were dissolved and mixed, to prepare a reaction mother liquor of the following composition.
Magnesium acetate tetrahydrate: 0.22 mmol/g (4.7 mass %)
Barium acetate: 0.22 mmol/g (5.6 mass %)
Tetrafluoroboric acid: 0.88 mmol/g (7.7 mass %)
Hexamethylene tetramine: 1.53 mmol/g (21.4 mass %)
Water: 60.6 mass %
This mother liquor was put into an open-to-the-atmosphere type reactor equipped with a reflux condenser. With stirring, it was heated for three hours at 80° C. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 7. A liquid prepared by combining the filtrate with the primary washing water was neutral (pH: about 6). The obtained dry substance salt 7 was confirmed by a powder X-ray diffraction method to be $BaMgF_4$. As a result of observing the dry substance salt 7 with a scanning electron microscope, it was found to be composed of monodispersed primary particles with uniform particle size and shape.

Example 8

At room temperature, respective components were dissolved and mixed, to prepare a reaction mother liquor of the following composition.
Strontium chloride hexahydrate: 0.18 mmol/g (4.8 mass %)
Aluminum chloride hexahydrate: 0.18 mmol/g (4.3 mass %)
Tetrafluoroboric acid: 0.89 mmol/g (7.8 mass %)
Hexamethylene tetramine: 1.57 mmol/g (22.0 mass %)
Water: 61.1 mass %
This mother liquor was put into an open-to-the-atmosphere type reactor equipped with a reflux condenser. With stirring, it was heated for two hours at 80° C. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 8. The obtained dry substance salt 8 and a baked body of the dry substance salt 8 prepared by baking the dry substance salt at 600° C. for two hours were each confirmed by a powder X-ray diffraction method to be $SrAlF_5$. As a result of observing the dry substance salt 8 with a scanning electron microscope, it was found to be composed of monodispersed primary particles with uniform particle size and shape.

Example 9

At room temperature, respective components were dissolved and mixed, to prepare a reaction mother liquor of the following composition.
Lithium chloride: 0.15 mmol/g (0.6 mass %)
Strontium chloride hexahydrate: 0.15 mmol/g (4.0 mass %)
Aluminum chloride hexahydrate: 0.15 mmol/g (3.6 mass %)
Tetrafluoroboric acid: 0.89 mmol/g (7.8 mass %)
Hexamethylene tetramine: 1.61 mmol/g (22.6 mass %)
Water: 61.4 mass %

This mother liquor was put into an open-to-the-atmosphere type reactor equipped with a reflux condenser. With stirring, it was heated for six hours at 80° C. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 9. The obtained dry substance salt 9 was confirmed by a powder X-ray diffraction method to be $LiSrAlF_6$. As a result of observing the dry substance salt 9 with a scanning electron microscope, it was found to be composed of monodispersed primary particles with uniform particle size and shape.

Example 10

At room temperature, respective components were dissolved and mixed, to prepare a reaction mother liquor of the following composition.
Lithium chloride: 0.15 mmol/g (0.6 mass %)
Calcium chloride dihydrate: 0.15 mmol/g (2.2 mass %)
Aluminum chloride hexahydrate: 0.15 mmol/g (3.6 mass %)
Tetrafluoroboric acid: 0.92 mmol/g (8.1 mass %)
Hexamethylene tetramine: 1.67 mmol/g (23.4 mass %)
Water: 62.1 mass %

This mother liquor was put into an open-to-the-atmosphere type reactor equipped with a reflux condenser. With stirring, it was heated for six hours at 80° C. With the passage of time, a white-color solid was gradually precipitated. It was allowed to cool by stopping the heating. After that, the precipitated white-color solid was separated by filtration, followed by washing with water and acetone and then air-drying, thereby obtaining a dry substance salt 10. The obtained dry substance salt 10 was confirmed by a powder X-ray diffraction method to be $LiCaAlF_6$. As a result of observing the dry substance salt 10 with a scanning electron microscope, it was found to be composed of monodispersed primary particles with uniform particle size and shape.

Example 11

At room temperature, respective components were dissolved and mixed, to prepare a reaction mother liquor of the following composition.

Lithium acetate: 0.20 mmol/g (1.3 mass %)
Strontium acetate 0.5-hydrate: 0.20 mmol/g (4.3 mass %)
Aluminum chloride hexahydrate: 0.20 mmol/g (4.8 mass %)
Ammonium hexafluorophosphate: 0.62 mmol/g (10.1 mass %)
Acetic acid: 6.00 mmol/g (36.0 mass %)
Water: 43.5 mass %

This mother liquor was put into a sealed reactor. With stirring, it was heated for 16 hours in an oil bath of 170° C. The inside pressure of the container gradually increased and reached 0.52 MPa-G. It was allowed to cool by stopping the heating. After that, the precipitated solid was separated by decantation, followed by adding water to disperse it. Then, it was centrifuged and recovered by conducting filtration. After washing with acetone, it was air-dried to obtain a dry substance salt 11. The obtained dry substance salt 11 was confirmed by a powder X-ray diffraction method to be $LiSrAlF_6$. As a result of observing the dry substance salt 11 with a scanning electron microscope, it was found to be composed of monodispersed primary particles with uniform particle size and shape.

Example 12

At room temperature, respective components were dissolved and mixed, to prepare a reaction mother liquor of the following composition.
Lithium acetate: 0.25 mmol/g (1.6 mass %)
Barium acetate: 0.25 mmol/g (6.4 mass %)
Ammonium hexafluorophosphate: 0.76 mmol/g (12.4 mass %)
Acetic acid: 3.75 mmol/g (22.5 mass %)
Water: 57.1 mass %

This mother liquor was put into a sealed reactor. With stirring, it was heated for 17 hours in an oil bath of 170° C. The inside pressure of the container gradually increased and reached 0.34 MPa-G. It was allowed to cool by stopping the heating. After that, the precipitated solid was recovered by filtration, followed by washing with water and acetone and then air-drying, thereby obtaining a dry substance salt 12. The obtained dry substance salt 12 was confirmed by a powder X-ray diffraction method to be $BaLiF_3$. As a result of observing the dry substance salt 12 with a scanning electron microscope, it was found to be composed of monodispersed primary particles with uniform particle size and shape.

Example 13

At room temperature, respective components were dissolved and mixed, to prepare a reaction mother liquor of the following composition.
Sodium chloride: 0.40 mmol/g (2.3 mass %)
Iron (III) chloride hexahydrate: 0.40 mmol/g (10.8 mass %)
Tetrafluoroboric acid: 0.80 mmol/g (7.0 mass %)
Hexamethylene tetramine: 1.20 mmol/g (16.8 mass %)
Water: 63.1 mass %

This mother liquor was put into a sealed reactor. With stirring, it was heated for 19 hours in an oil bath of 140° C. The inside pressure of the container increased and reached 0.6-0.86 MPa-G. It was allowed to cool by stopping the heating. After that, the precipitated solid was recovered by filtration, followed by washing with water and then drying at 140° C. under nitrogen flow, thereby obtaining a dry substance salt 13. The obtained dry substance salt 13 was confirmed by a powder X-ray diffraction method to be $(NH_4)_2NaFeF_6$. As a result of observing the dry substance salt 13 with a scanning electron microscope, it was found to be composed of monodispersed primary particles with uniform particle size and shape.

Example 14

At room temperature, respective components were dissolved and mixed, to prepare a reaction mother liquor of the following composition.
Magnesium acetate tetrahydrate: 0.28 mmol/g (6.0 mass %)
Barium acetate: 0.28 mmol/g (7.2 mass %)
Tetrafluoroboric acid: 1.12 mmol/g (9.8 mass %)
Water: 77.0 mass %

This mother liquor was put into an open-to-the-atmosphere reactor equipped with a reflux condenser. While conducting a heating at 80° C. with stirring, 25 mass % aqueous ammonia, which was equivalent to 53 mass % of the total of the reaction mother liquor, was gradually added dropwise by spending five hours. With the passage of time, a white-color solid was gradually precipitated. It was allowed to cool by stopping the heating. After that, the precipitated solid was separated by filtration, followed by washing with water and acetone and then air-drying, thereby obtaining a dry substance salt 14. The obtained dry substance salt 14 was confirmed by a powder X-ray diffraction method to be $BaMgF_4$. As a result of observing the dry substance salt 14 with a scanning electron microscope, it was found to be composed of monodispersed primary particles with uniform particle size and shape.

Example 15

At room temperature, respective components were dissolved and mixed, to prepare a reaction mother liquor of the following composition.
Strontium chloride hexahydrate: 0.23 mmol/g (6.2 mass %)
Aluminum chloride hexahydrate: 0.23 mmol/g (5.6 mass %)
Tetrafluoroboric acid: 1.14 mmol/g (10.0 mass %)
Water: 78.2 mass %

This mother liquor was put into an open-to-the-atmosphere reactor. With stirring at room temperature, 25 mass % aqueous ammonia, which was equivalent to 55 mass % of the total of the reaction mother liquor, was gradually added dropwise by spending ten hours. With the passage of time, a white-color solid was gradually precipitated. The precipitated solid was separated by filtration, followed by washing with water and acetone and then air-drying, thereby obtaining a dry substance salt 15. The obtained dry substance salt 15 was confirmed by a powder X-ray diffraction method to be $SrAlF_5$. As a result of observing the dry substance salt 15 with a scanning electron microscope, it was found to be composed of monodispersed primary particles with uniform particle size and shape.

Example 16

At room temperature, respective components were dissolved and mixed, to prepare a reaction mother liquor of the following composition.
Lithium chloride: 0.19 mmol/g (0.8 mass %)
Strontium chloride hexahydrate: 0.19 mmol/g (5.2 mass %)
Aluminum chloride hexahydrate: 0.19 mmol/g (4.7 mass %)
Tetrafluoroboric acid: 1.15 mmol/g (10.1 mass %)
Water: 79.2 mass %

This mother liquor was put into an open-to-the-atmosphere reactor equipped with a reflux condenser. While conducting a heating at 80° C. with stirring, 25 mass % aqueous ammonia, which was equivalent to 57 mass % of the total of the reaction mother liquor, was gradually added dropwise by spending ten hours. With the passage of time, a white-color solid was gradually precipitated. It was allowed to cool by stopping the heating. After that, the precipitated solid was separated by filtration, followed by washing with water and acetone and then air-drying, thereby obtaining a dry substance salt 16. The obtained dry substance salt 16 was confirmed by a powder X-ray diffraction method to be $LiSrAlF_6$. As a result of observing the dry substance salt 16 with a scanning electron microscope, it was found to be composed of monodispersed primary particles with uniform particle size and shape.

Example 17

At room temperature, respective components were dissolved and mixed, to prepare a reaction mother liquor of the following composition.
Sodium chloride: 0.48 mmol/g (2.8 mass %)
Iron (III) chloride hexahydrate: 0.48 mmol/g (13.0 mass %)
Tetrafluoroboric acid: 0.96 mmol/g (8.4 mass %)
Water: 75.8 mass %

This mother liquor was put into an open-to-the-atmosphere reactor. With stirring at room temperature, 25 mass % aqueous ammonia, which was equivalent to 39 mass % of the total of the reaction mother liquor, was gradually added dropwise by spending ten hours. With the passage of time, a solid was gradually precipitated. The precipitated solid was recovered by filtration, followed by washing with water and then drying at 140° C. under nitrogen flow, thereby obtaining a dry substance salt 17. The obtained dry substance salt 17 was confirmed by a powder X-ray diffraction method to be $(NH_4)_2NaFeF_6$. As a result of observing the dry substance salt 17 with a scanning electron microscope, it was found to be composed of monodispersed primary particles with uniform particle size and shape.

Comparative Example 1

At room temperature, respective components were dissolved and mixed, to prepare a reaction mother liquor of the following composition.
Magnesium acetate tetrahydrate: 0.50 mmol/g (10.7 mass %)
Barium acetate: 0.50 mmol/g (12.8 mass %)
Water: 76.5 mass %

This mother liquor was put into an open-to-the-atmosphere reactor equipped with a reflux condenser. While conducting a heating at 80° C. with stirring, ammonium acid fluoride ($NH_4HF_2$) aqueous solution (concentration: 7.2 mmol/g), which was equivalent to 16.8 mass % of the total of the reaction mother liquor, was added dropwise. At the same time as this dropping, a precipitation was generated. While the temperature was maintained at 80° C., it was aged for two hours. After that, it was allowed to cool by stopping the heating. After that, the precipitated white-color solid was separated by filtration, followed by washing with water and acetone and then air-drying, thereby obtaining a dry substance salt 18. The obtained dry substance salt 18 was confirmed by a powder X-ray diffraction method to be BaMgF$_4$. As a result of observing the dry substance salt 18 with a scanning electron microscope, as shown in FIG. 2, it was found that crystals had nonuniformly grown, and it was found to be composed of multidispersed particles with nonuniform particle sizes and shapes.

Figure 2:
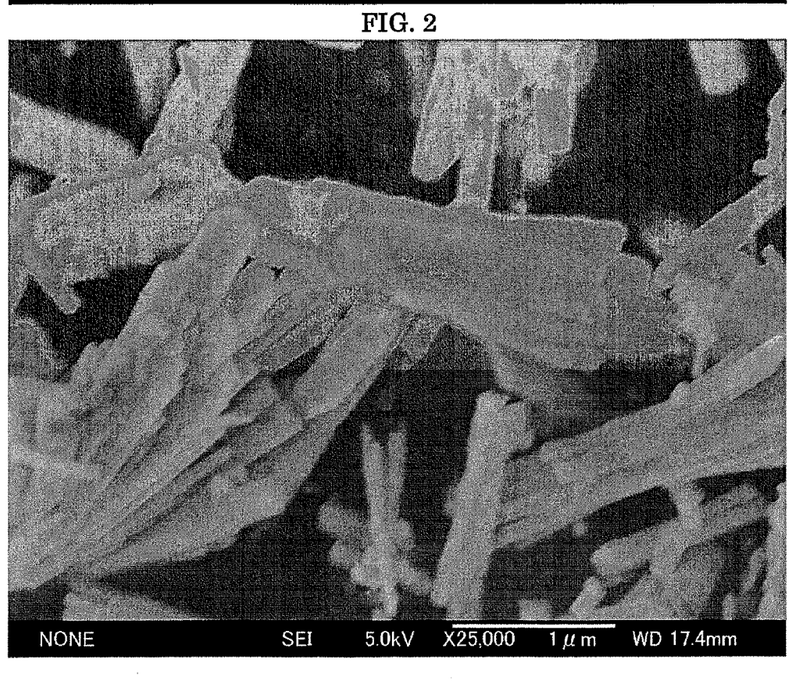
FIG. 2 is an electron microscope photograph showing one example of a fluorine-containing complex salt produced by a production process for comparison.

From FIG. 1 and FIG. 2, it is understood that fluorine-containing complex salt particles (Comparative Example 1) for comparison, produced by using ammonium acid fluoride as a fluorine source, are multidispersed with nonuniform particle sizes and shapes. In contrast with this, it is understood that fluorine-containing complex salt particles of the present invention (Example 1) prepared by using fluoroanions as a fluorine source and using application of heat and addition of acid as a trigger are monodispersed with uniform particle size and shape.

Comparative Example 2

At room temperature, respective components were dissolved and mixed, to prepare a reaction mother liquor of the following composition.

Magnesium acetate tetrahydrate: 0.10 mmol/g (2.1 mass %)
Barium acetate: 0.10 mmol/g (2.5 mass %)
Trifluoroacetic acid: 1.08 mmol/g (12.3 mass %)
2-propanol 75.1 mass %
Water: 8.0 mass %

This mother liquor was put into an open-to-the-atmosphere reactor equipped with a reflux condenser, followed by heating at 80° C. for three hours with stirring. Then, the mother liquor was transferred to an evaporating dish, followed by drying at 80° C. in a dryer to obtain a dry substance salt 19. The dry substance salt 19 was baked at 400° C. or 600° C. for two hours each. With this, it was confirmed by a powder X-ray diffraction method that, in each case, main products of the baked body were BaF$_2$ and MgF$_2$ and that diffraction intensity of BaMgF$_4$ was weaker than those of these simple salts.

Comparative Example 3

At room temperature, respective components were dissolved and mixed, to prepare a reaction mother liquor of the following composition.

Magnesium trifluoromethanesulfonate: 0.30 mmol/g (9.5 mass %)
Barium trifluoromethanesulfonate: 0.30 mmol/g (12.9 mass %)
Trifluoromethanesulfonic acid: 0.57 mmol/g (8.6 mass %)
Water: 69.0 mass %

This mother liquor was put into an open-to-the-atmosphere reactor equipped with a reflux condenser, followed by heating at 80° C. for three hours with stirring. Then, the mother liquor was transferred to an evaporating dish, followed by drying at 95° C. in a dryer to obtain a dry substance salt 20. The dry substance salt 20 was baked at 600° C. for two hours. With this, it was confirmed by a powder X-ray diffraction method that main products of the baked body were BaF$_2$ and MgF$_2$ and that diffraction intensity of BaMgF$_4$ was weaker than those of these simple salts.

Comparative Example 4

At room temperature, respective components were dissolved and mixed, to prepare a reaction mother liquor of the following composition.

Strontium acetate hemihydrate: 0.10 mmol/g (2.1 mass %)
Aluminum ethoxide: 0.10 mmol/g (1.6 mass %)
Trifluoroacetic acid: 1.08 mmol/g (12.3 mass %) 2-propanol 76.0 mass %
Water: 8.0 mass %

This mother liquor was put into an open-to-the-atmosphere reactor equipped with a reflux condenser, followed by heating at 80° C. for three hours with stirring. Then, the mother liquor was transferred to an evaporating dish, followed by drying at 80° C. in a dryer to obtain a dry substance salt 21. The dry substance salt 21 was baked at 400° C. or 600° C. for two hours each. With this, it was confirmed by a powder X-ray diffraction method that, in each case, main products of the baked body were SrF$_2$ and AlF$_3$ and that diffraction intensity of SrAlF$_5$ was weaker than those of these simple salts.

Comparative Example 5

Equimolar amounts of powdery magnesium fluoride reagent and barium fluoride reagent were taken, followed by kneading in a mortar and then baking at 600° C. for two hours. It was confirmed by a powder X-ray diffraction method that the baked body remained a mixture of BaF$_2$ and MgF$_2$ and that BaMgF$_4$ phase was not formed.

The invention claimed is:

1. A process for producing a fluorine-containing complex salt comprising the step of triggering a reaction on a reaction mother liquor containing a plurality of cation species and a fluoroanion in a state that they have been dissolved in a solvent, wherein triggering the reaction applies energy to the reaction mother liquor, changes acidity of the reaction mother liquor, or both, thereby accelerating decomposition of the fluoroanion and precipitating a complex salt containing a plurality of cation species and fluorine, as a solid, from the reaction mother liquor,
wherein the fluoroanion has an A-F bond, wherein A is at least one element selected from the group consisting of Al, Ti, B, Si, P, S, As, Se, Sb and Te.

2. The process for producing a fluorine-containing complex salt as claimed in claim 1, wherein at least one species of the plurality of cation species is a monovalent cation of an element of group 1, an at least divalent cation of an element of group 2, or an at least trivalent cation of an element of group 3 to group 13.

3. The process for producing a fluorine-containing complex salt as claimed in claim 1, wherein the fluoroanion is at least one selected from the group consisting of TiF$_6^{2-}$, AlF$_6^{3-}$, BF$_4^-$, SiF$_6^{2-}$, PF$_6^-$, PO$_3$F$_2^-$, PO$_2$F$_2^-$, and SO$_3$F$^-$.

4. The process for producing a fluorine-containing complex salt as claimed in claim 1, wherein the substance for changing acidity of the reaction mother liquor is at least one selected from the group consisting of an acid, a base, and a chemical species that generates an acid or base by applying energy.

* * * * *